April 1, 1952 — R. E. BOTTS — 2,591,504
HOG CARCASS GRADE CALCULATOR
Filed Feb. 10, 1950 — 2 SHEETS—SHEET 1
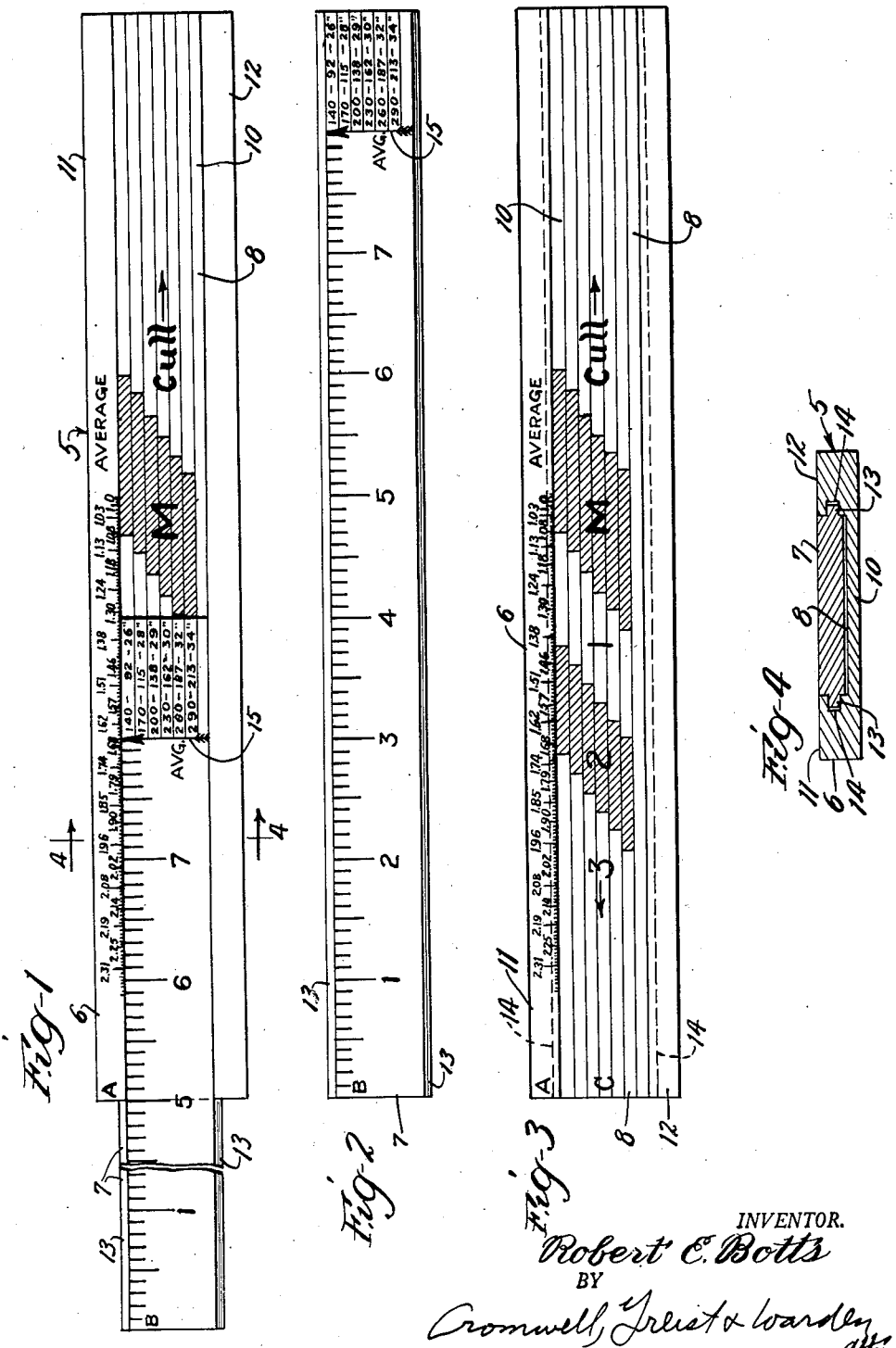
INVENTOR.
Robert E. Botts
BY
Cromwell, Greist & Warden
Attys

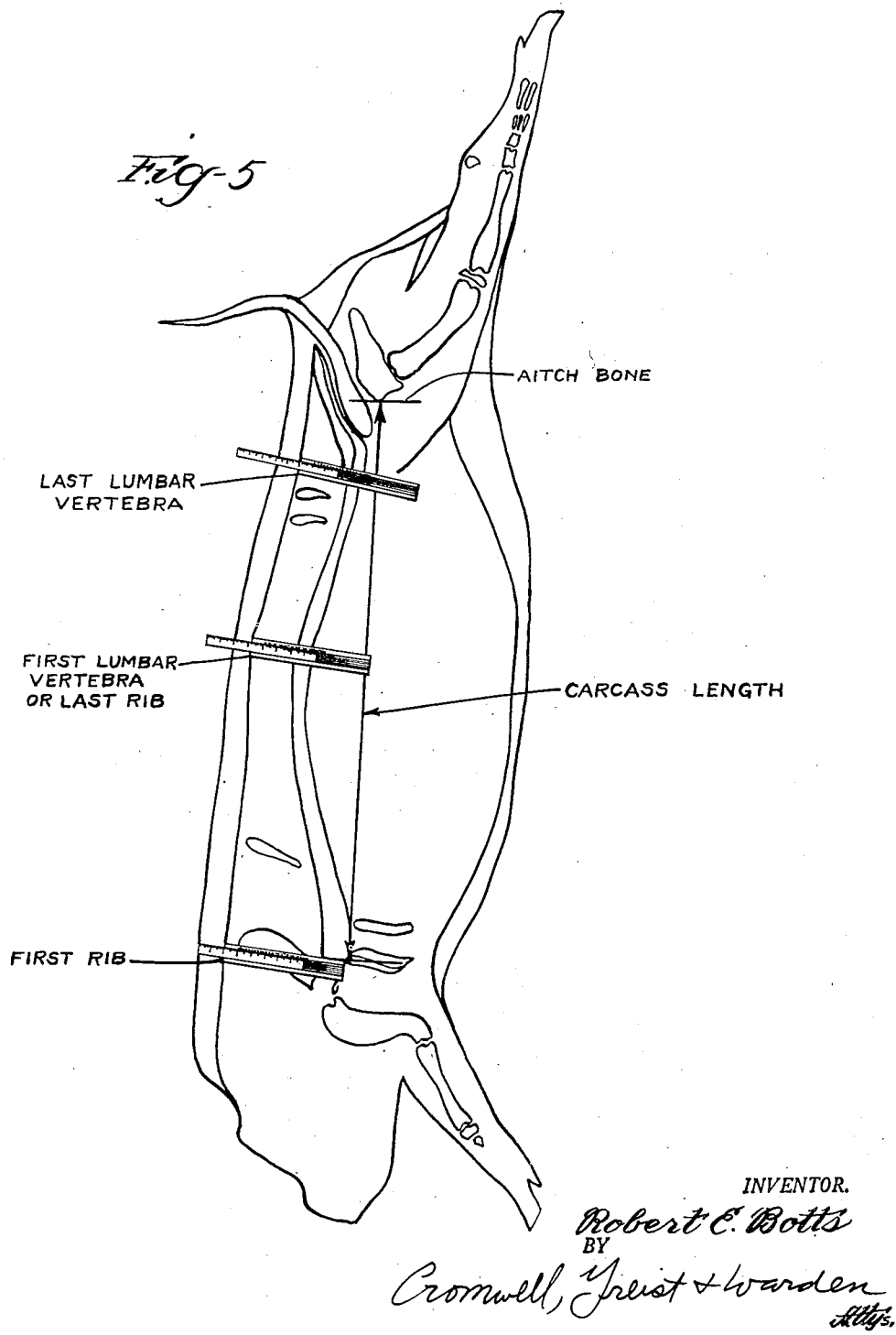

Patented Apr. 1, 1952

2,591,504

UNITED STATES PATENT OFFICE 2,591,504

HOG CARCASS GRADE CALCULATOR

Robert E. Botts, Madison, Wis., assignor to Oscar Mayer & Co., Inc., Chicago, Ill., a corporation of Illinois Application February 10, 1950, Serial No. 143,455

6 Claims. (Cl. 33—169)

This invention relates to a slide-rule type calculator for grading hog carcasses according to an empirical grading system wherein one factor is average fat back thickness and a second factor is one selected from the group consisting of live weight, corresponding carcass weight and corresponding carcass length.

The value of a hog, either as the animal or as the carcass, is dependent upon the type of hog (e. g. lean or lard type) and the quality or finish. These factors account for the fact that there may well be considerable difference in the value of two animals or carcasses having the same weight. For example, an animal or carcass which will produce a maximum of lean cuts, and is also of high quality, will be worth considerably more than another animal or carcass of the same weight which produces a lower yield of lean cuts and has a poor quality.

Investigations have been made both by governmental agencies, and members of the packing industry, with a view of establishing a fair and accurate empirical grading system for hog carcasses based on the fact that lean cuts of first grade quality demand the premium price. As the result of such investigations, it has been found that there are two physical factors which, when properly correlated, serve to provide the basis of an accurate and sound grading system. One of the factors is the average fat back thickness of the hog carcass. The other factor is one selected from the correlated group consisting of either live weight, corresponding carcass weight, or corresponding carcass length. With respect to the second factor, it is to be understood that any one of the values including live weight, carcass weight and carcass length will have two corresponding other values. For this reason, this group of three values is treated as a single factor.

One proposed grading system based on average fat back thickness as one factor and one of the group comprising live weight and corresponding carcass weight or carcass length as another factor, is described in a bulletin dated August 5, 1949, entitled "Standards for Grades of Slaughter Hogs and Pork Carcasses," published by the United States Department of Agriculture, Production and Marketing Administration, Livestock Branch. This grading system described in this bulletin has been thoroughly tested and has been found to be accurate, reliable and practical and generally satisfactory. It will, of course, be understood that certain modifications may be made in the scoring or grading system without departing from the basic principles thereof.

In order to grade a carcass in accordance with this grading system, it is necessary to measure the fat back thickness at three different anatomical locations, namely, opposite the first rib, opposite the first lumbar vertebra and opposite the last lumbar vertebra. The measurements at these three locations on any particular carcass are totaled and then divided by three to give the average fat back thickness factor.

The other or second factor necessary to complete the scoring or grading of a carcass is any one of the three values, live weight, carcass weight or carcass length. The carcass length is taken as the distance between the first rib to the lowest point of the H-bone. For each particular carcass, there is a set of these three values. Accordingly, if any one of these three values is known, the grade can be obtained without a knowledge of the others. For example, if the carcass weight is known, it is not necessary to also know the carcass length or the live weight.

The grading system containing in the Department of Agriculture August 5, 1949 bulletin referred to above is summarized in the following table:

*Table I*

[Weight (lbs.) average back fat thickness of carcass, by grade[1]]

| Live | Carc. | Choice No. 1 | Choice No. 2 | Choice No. 3 | Medium | Cull |
|---|---|---|---|---|---|---|
|  |  | Inches | Inches | Inches | Inches | Inches |
| 140 | 92 | 1.46–1.74 | 1.74–2.03 | More than 2.03. | 1.03–1.46 | Less than 1.03. |
| 170 | 115 | 1.51–1.79 | 1.79–2.08 | More than 2.08. | 1.08–1.51 | Less than 1.08. |
| 200 | 138 | 1.57–1.85 | 1.85–2.14 | More than 2.14. | 1.13–1.57 | Less than 1.13. |
| 230 | 162 | 1.62–1.90 | 1.90–2.19 | More than 2.19. | 1.18–1.62 | Less than 1.18. |
| 260 | 187 | 1.68–1.96 | 1.96–2.25 | More than 2.25. | 1.24–1.68 | Less than 1.24. |
| 290 | 213 | 1.74–2.02 | 2.02–2.13 | More than 2.31. | 1.30–1.74 | Less than 1.30. |
| 320 | 240 |  |  |  |  |  |

[1] Average of measurements made opposite first and last ribs and last lumbar vertebra.

One practical difficulty of the foregoing type of grading system is the time and care entailed in making the necessary measurements and the appropriate calculations, and table references. When it is considered that the system has to be applied daily to a large run of animals at the packing house, it becomes apparent that, despite the proven accuracy of the system, it involves practical difficulties tending to prevent its adoption.

The object of the present invention, generally stated, is a slide-rule type calculator device which is simple, rapid and accurate in operation and which permits the empirical grading system to be adopted without entailing any of the practical difficulties which would otherwise tend to prevent the adoption of the system on a large scale.

An important object of the invention is a slide-rule type calculator which may be used to ascertain, without calculation, the average back fat thickness of a hog carcass and automatically set up a grade reading on the calculator device.

Still another object of the invention is a slide-rule type calculator for grading hog carcasses according to an empirical grading or scoring system where one factor is average fat back thickness measured at predetermined anatomical locations and another factor is a value from the group comprising live weight, corresponding carcass length and corresponding carcass weight.

Another important object is a slide-rule type calculator for grading hog carcasses which may be used like an ordinary ruler to total the fat back thickness at different locations and automatically provides a reading of the average fat back thickness with the parts of the calculator also simultaneously set up to give a grade reading on the carcass.

Certain other objects of the invention will, in part, be obvious and will, in part, appear hereinafter.

For a more complete understanding of the nature and scope of the invention, reference may now be had to the following detailed description thereof, taken in connection with the accompanying drawings, wherein:

Fig. 1 is a top plan view of the slide-rule type calculator forming one embodiment of the invention with one of the interfitting slide members being pulled out from its zero position so as to illustrate the manner in which the calculator is used to obtain a grade reading on a hog carcass;

Fig. 2 is a top plan view of one member of the calculator shown in Fig. 1;

Fig. 3 is a top plan view of the member which interfits in the members shown in Fig. 2;

Fig. 4 is a vertical sectional view taken on line 4—4 of Fig. 1; and

Fig. 5 is a diagrammatic view illustrating the manner in which the calculator device of Fig. 1 is used in scoring or grading a hog carcass.

Referring to the drawings, the reference character 5 designates, generally, in Fig. 1 a slide-rule type calculator device which forms a preferred embodiment of the invention. The calculator 5 comprises two interfitting slide-rule members 6 and 7 of equal length. The member 6 is the larger member and has a channel 8 formed in the top face thereof for receiving the member 7. The channel 8 has a bottom or floor 10, and the sides of the channel are defined by parallel side walls or side strips 11 and 12.

In order to retain the member 7 within the channel 8 and to guide its movement therein, a tongue and groove arrangement is incorporated in the calculator 5. Thus, referring to Fig. 4 of the drawings, it will be seen that the member 7 has tongues 13—13 extending along opposite sides thereof, and the opposite side walls 11 and 12 of the member 6 are provided with grooves 14—14 for receiving the tongues 13.

The calculator 5 is designed and calibrated on the basis of the empirical grading system described above, and summarized in the foregoing table. The slide-rule member 7 bears a scale designated at B which is graduated in inches starting with zero at the left end edge and extending to eight inches where there is an index mark or arrow designated at 15. The space between the index 15 and the right-hand edge of the member 7 carries a table wherein the corresponding values, live weight, carcass weight and carcass length, are tabulated on lines extending parallel to the length of the member 7.

The slide-rule member 6 carries a scale A on the upper strip or wall 11 which is graduated so as to read average fat back thickness, based upon three measurements of fat back being taken. The scale A is so graduated and so located that when the member 7 is withdrawn any distance $d$ to the left of the left-hand edge of the slide-rule member 6, then the index 15 will register opposite a position on the scale A equal to the value or quotient obtained by dividing the value or distance $d$ by three.

The floor or bottom of the channel 8 carries a grade chart which is designated as scale C. This grade chart conforms to the empirical grading system proposed by the Department of Agriculture and summarized in the foregoing table. It will be noted that the scale or chart C is divided into five different areas. Reading from left to right, the first area is choice No. 3, the second area is choice No. 2, and the third area is choice No. 1, the fourth area is medium, and the fifth area is cull. It will be noted that each of the five areas consist of seven steps and referring to Fig. 1 it will be seen that each of the steps forms an extension of the horizontal divisions or lines of the table carried on the right-hand end of the member 7. The scale C is thus oriented and laid out with respect both to the table on the member 7 and the scale A on the member 6 so that by placing the index 15 opposite the average fat back thickness factor the carcass grade can be directly read off from the grade chart C by following along the particular line of the scale which gives the desired value of the group live weight, carcass weight and carcass length, to the right-hand edge of the member 7. By noting in which of the five areas the intersection between the right-hand edge of the member 7 and the particular table line carrying the proper set of live weight, carcass weight and carcass length values lies, the reader or user is immediately provided with the grade or score of the hog carcass under consideration.

In order that the nature of the invention may be more fully appreciated, one actual usage of the calculator 5 in grading the hog carcass will now be described in connection with Figs. 1 and 5. In Fig. 5 a typical hog carcass is shown diagrammatically. In using the calculator 5, the grader first places the left-hand edge of the member 6 on the inside line of the fat back opposite the first rib and then extends or withdraws the member 7 until the left-hand edge of it is aligned with the outer edge of the fat back thickness at this location. Assume that the thickness of the fat back at this point is one and one-half inches. Without disturbing the relationship between the slide-rule members 6 and 7, the grader next moves to the first lumbar vertebra and again places the left-hand edge of the member 6 along the inside line of the fat back at this point. The grader then withdraws the member 7 an additional distance, e. g. one inch, which corresponds to the thickness of the fat back at this point. This operation may be conveniently and accurately carried out by a grader placing his thumbnail opposite the one and one-half inch graduation or whatever graduation may have been obtained adjacent the first rib, and merely pulling out the member 7 until the thumbnail is aligned with the outer edge of the fat back. The grader then proceeds to the point opposite the last lumbar vertebra and repeats the operation by pulling out the member 7 an additional distance corresponding to the thickness of the fat back at this point which may, for example, be two and one-half inches.

Using the three assumed values of the fat back thickness mentioned above, the grader will now find that the member 7 has been withdrawn a total distance of five inches. It will, of course, be appreciated that normally the member 7 will not be pulled out an exact number of inches but that it is more likely to be at some fractional distance. However, the grader need not be concerned with this value $d$ at all but merely need observe the value which the index 15 registers on the scale A. Referring to Fig. 1 wherein the member 7 is shown withdrawn to a distance of five inches, it will be noted that the index 15 lies opposite a value of 1.66 on the scale A. In using the scale it is not even necessary to observe this average fat back thickness reading, rather, the grader merely needs to find on the table on the right-hand end of the member 7 the line carrying any one of the three corresponding values, live weight, carcass weight and carcass length, for the particular carcass being graded. Assume, for example, that the carcass shown in Fig. 5 has a carcass weight of 150 pounds. The third line from the top of the table is the line for carcasses having carcass weights ranging from 138 pounds up to 162 pounds, which is the next lower line, e. g. line 4. Accordingly, by noting that the position of the end of the table line for the value 138, e. g. the third line down on the table, it will be seen that this line terminates in the area where the grade is choice No. 1.

From the foregoing description of the manner in which the calculator device 5 is used, it will be seen that a grader requires only very little instruction as to the manner in which it is used, and is immediately able to use the device to obtain the grade or score value in a very simple manner without making any intermediate calculations whatever.

It will, of course, be appreciated that certain rearrangements of scales and modifications of the calculator device will occur to those skilled in the art. Accordingly, it is intended that all matter described or shown in the accompanying drawings shall be interpreted as illustrative and not in a limiting sense.

What is claimed as new is:

1. A slide-rule type calculator for grading hog carcasses according to an empirical grading system wherein one factor is the average value obtained by measuring fat back thickness at $x$ different predetermined anatomical locations, another factor is selected from the group consisting of live weight, carcass weight, and carcass length, and there is a grade corresponding to any encounterable combination of these two factors, said calculator comprising in combination, a pair of slidably interfitting slide-rule members, one of said members bearing a scale graduated in units of lengths, the other of said members bearing a scale graduated in average fat back thickness so that when said length scale bearing member is pulled out any distance $d$ from its zero position relative to said fat back scale, an index on said length scale bearing member will register on said fat back scale a value equal to the quotient obtained by dividing $d$ by $x$, one of said members carrying a table having divisions extending parallel to the length of the member and tabulated in at least one of said factors of the group consisting of live weight, carcass weight and carcass length, and said average fat back thickness scale bearing member also carrying a grade chart oriented both with respect to said average fat back thickness scale and said table, whereby the grade corresponding to any encounterable combination of said two factors may be read directly on said grade chart.

2. The slide-rule type calculator of claim 1 wherein said lengthwise scale is graduated in inches, $x$ is equal to three and said anatomical locations are at the first rib, the first lumbar vertebra, and the last lumbar vertebra.

3. The slide-rule type calculator of claim 1 wherein one of said slide-rule members has a channel extending lengthwise therethrough, the other slide-rule member fits slidably in said channel, and said members have tongue and groove means for retaining said members in said interfitting relationship.

4. A slide-rule type calculator for grading hog carcasses according to an empirical grading system wherein one factor is the average value obtained by measuring fat back thickness at $x$ different predetermined anatomical locations, another factor is selected from the group consisting of live weight, carcass weight, and carcass length, and there is a grade corresponding to any encounterable combination of these two factors, said calculator comprising a slide-rule member having a channel extending lengthwise thereof in between channel-defining side walls, a second slide-rule members slidably fitting in said channel, said members having tongue and groove means for retaining said second member in said channel and allowing said second member to be withdrawn from said first member, said second member bearing a scale graduated in inches, one of said channel-defining side walls bearing a scale graduated in average fat back thickness in inches so that when said second member is pulled out any distance $d$ from its zero position relative to said fat back scale an index on said second member will register on said fat back scale a value equal to the quotient obtained by dividing $d$ by $x$, said second member also bearing a table having divisions extending parallel to the length of said second member and tabulated in at least one of said factors of the group consisting of live weight, carcass weight and carcass length, and said first member bearing a grade chart on the floor of said channel oriented both with respect to said average fat back thickness scale and said table whereby the grade corresponding to any encounterable combination of said two factors may be read directly on said grade chart.

5. The slide-rule type calculator of claim 4 wherein the value $x$ is three and said anatomical locations are at the first rib, the first lumbar vertebra and the last lumbar vertebra.

6. A calculator for grading hog carcasses according to an empirical grading system wherein one factor is the average value obtained by measuring fat back thickness at $x$ different predetermined anatomical locations, another factor is selected from the group consisting of live weight, carcass weight, and carcass length, and there is a grade corresponding to any encounterable combination of these two factors, said calculator comprising a member having a channel extending lengthwise thereof in between channel-defining side walls, a second member slidably fitting in said channel, said second member bearing a longitudinal scale graduated in inches and a table having divisions extending parallel to the length of said second member and tabulated in at least one of said factors of the group consisting of live weight, carcass weight and carcass length, and said first member bearing a grade chart on the floor of said channel oriented both with respect to the fat back thickness measured by pulling out said second member as well as with said table on said second member whereby the grade corresponding to any encounterable combination of said two factors may be read directly on said grade chart.

ROBERT E. BOTTS.

REFERENCES CITED

The following references are of record in the file of this patent:

UNITED STATES PATENTS

| Number | Name | Date |
|---|---|---|
| 606,388 | Mack | June 28, 1898 |
| 651,142 | Keuffel | June 5, 1900 |
| 1,602,490 | Homan | Oct. 12, 1926 |
| 2,045,176 | Bush | June 23, 1936 |

FOREIGN PATENTS

| Number | Country | Date |
|---|---|---|
| 5,060 | Great Britain | Aug. 25, 1894 |
| 196,282 | Great Britain | Jan. 10, 1924 |